(12) United States Patent
Charles

(10) Patent No.: US 11,486,547 B1
(45) Date of Patent: Nov. 1, 2022

(54) MAGNETIC HANGER FOR WELDING EQUIPMENT

(71) Applicant: Nicholas Edmund Charles, Pasadena, TX (US)

(72) Inventor: Nicholas Edmund Charles, Pasadena, TX (US)

( * ) Notice: Subject to any disclaimer, the term of this patent is extended or adjusted under 35 U.S.C. 154(b) by 0 days.

(21) Appl. No.: 17/462,778

(22) Filed: Aug. 31, 2021

(51) Int. Cl.
F17C 13/08 (2006.01)
B25H 3/04 (2006.01)
B23K 37/00 (2006.01)

(52) U.S. Cl.
CPC ............ *F17C 13/084* (2013.01); *B25H 3/04* (2013.01); *B23K 37/00* (2013.01)

(58) Field of Classification Search
CPC .......... B23K 37/00; B25H 3/04; B65D 61/00; F17C 13/084
See application file for complete search history.

(56) References Cited

U.S. PATENT DOCUMENTS

| 2,313,944 | A | * | 3/1943 | Keener | A45F 3/10 |
| | | | | | 248/311.2 |
| 3,128,022 | A | * | 4/1964 | Mastrud, Jr. | B65D 61/00 |
| | | | | | 294/146 |
| 3,701,463 | A | * | 10/1972 | Goss | F17C 13/084 |
| | | | | | 294/142 |
| 4,290,529 | A | * | 9/1981 | Jones | B63B 59/02 |
| | | | | | 248/219.4 |
| 4,294,481 | A | * | 10/1981 | Pearl | F17C 13/084 |
| | | | | | 294/146 |
| 4,486,044 | A | * | 12/1984 | Gordon | F17C 13/084 |
| | | | | | 294/142 |
| 4,773,348 | A | * | 9/1988 | Rowley | E02B 3/26 |
| | | | | | 211/195 |
| 5,340,136 | A | * | 8/1994 | MacNeil | B62B 3/104 |
| | | | | | 280/47.35 |
| 6,056,255 | A | * | 5/2000 | Meade | F17C 13/084 |
| | | | | | 211/85.18 |
| 8,647,043 | B2 | * | 2/2014 | Lauvdal | B62B 1/145 |
| | | | | | 280/47.27 |
| 9,333,596 | B2 | * | 5/2016 | Luis Y Prado | B25H 3/00 |
| 10,053,124 | B2 | * | 8/2018 | Intravatola | B62B 1/264 |
| 2018/0079438 | A1 | * | 3/2018 | Intravatola | F17C 13/085 |

FOREIGN PATENT DOCUMENTS

DE 102017008813 A1 * 3/2019

* cited by examiner

*Primary Examiner* — Kimberley S Wright
(74) *Attorney, Agent, or Firm* — Jeffrey Streets; Madan Law PLLC

(57) ABSTRACT

A rack includes a first upper hook that opens upward and a first lower hook that opens downward, wherein the first upper and lower hooks are vertically aligned. Two or more permanent magnets are physically secured to the rack, wherein the permanent magnets are positioned to simultaneously magnetically engage a side surface of a cylindrical gas tank and magnetically secure the rack to the side surface of the cylindrical gas tank. A hose may be wound about the first and second hooks in a side-to-side configuration. In one option, the rack may include a second upper and lower hooks that extend in opposing lateral directions to receive separate hoses. In another option, the rack may be formed with tubular metal and the permanent magnets may be disposed inside vertical sections of the tubular metal. That rack may also secure a gas flow meter.

25 Claims, 9 Drawing Sheets

MAGNETIC HANGER FOR WELDING EQUIPMENT

The present disclosure relates to device used to store, transport and organize welding equipment.

BACKGROUND OF THE RELATED ART

Welding is a fabrication process that is used to join two metal pieces or objects. The process involves heating a portion of the metal pieces or objects where they are to be joined. Unlike brazing and soldering, welding uses temperatures that are high enough to actually melt the base metal of the metal pieces or objects. A filler material may also be melted along with the base metal, but the melted metals are then allowed to cool and fuse together to form a strong connecting joint between the two pieces or objects.

One important example of a welding process is referred to as tungsten inert gas (TIG) welding. TIG welding is a type of arc welding that uses a tungsten electrode and an inert shielding gas to prevent oxidation or contamination of the metal in the area being welded. Popular inert shielding gases for TIG welding include argon and helium. TIG welding with helium gas may be referred to as heliarc welding.

Some TIG welding processes will use a gas flowmeter and regulator that control a single gas flow stream. Such processes may require only a single gas hose. Other TIG welding processes may use a dual gas flowmeter and regulator that control two gas flow streams from a single gas source. Dual gas flow streams of the same gas composition at the same or separate flow rates may be used for back purging, trail purging or other dual applications. These later processes may require two gas hoses.

In any jobsite there is a need to organize and maintain welding hoses from becoming a hazard or being damaged. Loose hose that lay along the ground or a floor may cause workers to slip, trip, or fall. Loose or coiled hoses are also more likely become damaged due to a wide variety of activities and equipment at the job site. Even the simple act of improper storage of the hoses or gas flowmeter can lead to rips, cuts, frays, broken gauges, and damage to threaded parts. Toolboxes containing other tools that could potentially puncture or damage equipment are a particular hostile environment for the hoses and gas flowmeter. Although a daily pre-operational checklist of equipment including visual inspection of welding hoses and equipment will detect such damage, this damage may be expensive or cause work delays.

BRIEF SUMMARY

One embodiment provides an apparatus comprising a rack including a first upper hook and a first lower hook. The first upper hook is vertically aligned with the first lower hook, wherein the first upper hook opens upward and the first lower hook opens downward. The apparatus further includes two or more permanent magnets physically secured to the rack, wherein the permanent magnets are positioned to simultaneously magnetically engage a side surface of a cylindrical gas tank and magnetically secure the rack to the side surface of the cylindrical gas tank.

DETAILED DESCRIPTION

Figures 1A, 1B:
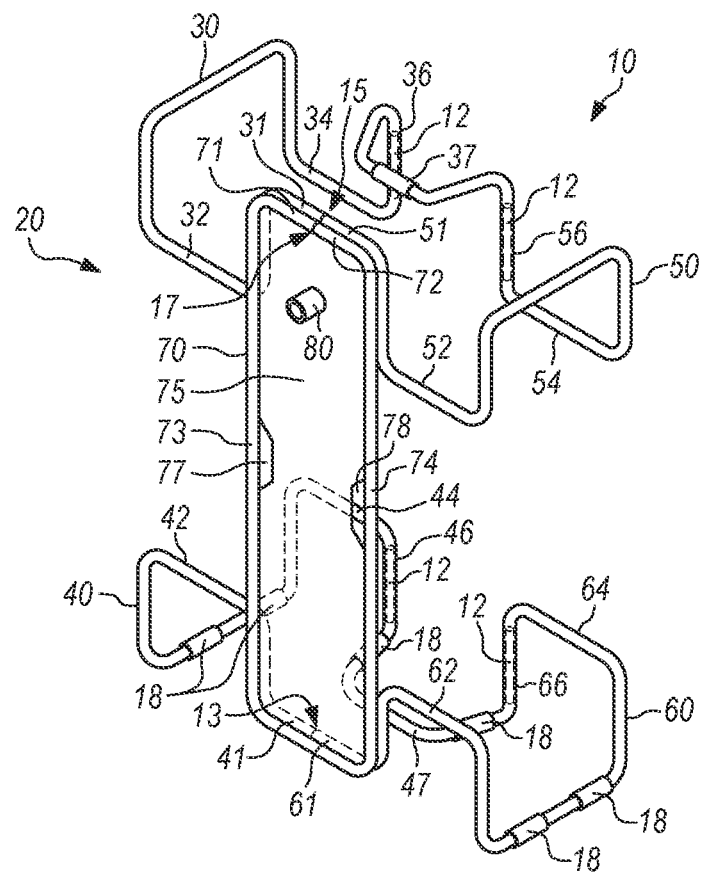
FIGS. 1A-B are perspective and front views of a magnetic hanger for supporting a gas flow meter and two gas hoses according to a first embodiment.

One embodiment provides an apparatus comprising a rack including a first upper hook and a first lower hook. The first upper hook is vertically aligned with the first lower hook, wherein the first upper hook opens upward, and the first lower hook opens downward. The apparatus further includes two or more permanent magnets physically secured to the rack, wherein the permanent magnets are positioned to simultaneously magnetically engage a side surface of a cylindrical gas tank and magnetically secure the rack to the side surface of the cylindrical gas tank.

In some embodiments, the first upper hook and the first lower hook may be disposed for winding a hose about the first upper hook and the first lower hook in a side-to-side configuration. The first upper hook and the first lower hook may cooperate together to establish a non-rotating hose reel, rack or hanger. The upper and lower hooks allow the hose to be wound snug so that the hose stays in place during transport or use of the rack.

In some embodiments, the rack may include a second upper hook and a second lower hook. The second upper hook opens upward, and the second lower hook opens downward. In addition, the second upper hook is preferably vertically aligned with the second lower hook. Optionally, the first upper hook and the first lower hook may extend in a first lateral direction, while the second upper hook and the second lower hook extend in a second lateral direction generally opposite of the first lateral direction. The first and second lateral directions may be referred to as left-ward and right-ward directions as a user faces the front of the rack. In some embodiments, the first upper hook and the first lower hook are disposed for winding a first hose about the first upper hook and the first lower hook in a front-to-back configuration, and the second upper hook and the second lower hook are disposed for winding a second hose about the second upper hook and the second lower hook in a front-to-back configuration.

In some embodiments, the rack may be formed with tubular metal. Tubular metal has the benefits of being strong and durable, while also having less weight than a solid metal bar or bracket. The tubular metal may have various cross-sections, such as square or circular. A preferred tubular metal is a metal pipe, which can be readily bent to form a rigid structure of various configurations. In one option, the tubular metal may be a metal pipe having a nominal pipe size of 0.5 inch, and the metal pipe may have bends with a radius between about 1 and about 2 inches. As non-limiting examples, the tubular metal may be 304 stainless steel, aluminum or other metal.

In some embodiments, the first upper and lower hooks may each form a loop hook. For example, the loop hook may be formed with a metal pipe having a continuous section of the metal pipe that extends out to form the hook. Furthermore, the entirety of the first upper hook and/or the first lower hook may be formed as a continuous section of metal pipe or other material that is free from sharp or hazardous edges or points. For example, the rack may include seamless contoured edges and joints. A preferred rack may be free of any sharp edges that could potentially cut a person, or the hoses being supported on the rack.

In some embodiments, the rack may include at least two vertical sections of the tubular metal that include one or more of the permanent magnets. The at least two vertical sections that include magnets are laterally spaced apart to receive an arc of the cylindrical gas tank between the at least two vertical sections. Optionally, one or more of the permanent magnets may be received in a hollow space within the tubular metal that forms each of the vertical sections. Furthermore, the permanent magnets received within the tubular metal of each vertical section may be retained in the vertical section of the tubular metal by bends, setbacks and/or crimps in the metal pipe at both ends of the vertical section where the permanent magnets are located. In one option, the permanent magnets that are retained in a vertical section are further secured in a fixed position such that the permanent magnets will not slide within the tubular metal. For example, the permanent magnets and the vertical section may have selected relative lengths such that the permanent magnets are caught by the setback of each bend and cinched into place.

In some embodiments, the rack may include one or more permanent magnets received within a plurality of tubular sections that may engage the tank. For example, a rack may have at permanent magnets received in one or more vertical sections, one or more horizontal sections, and/or one or more sections that is neither vertical nor horizontal. Accordingly, the number and placement of the permanent magnets may vary as a function of the tubular metal configuration of the rack and the amount of weight to be supported by the rack.

Some embodiments of the rack may further include a handle that is accessible along the top of the rack and is substantially centered front-to-back and side-to-side of the rack. The handle is positioned for a user to carry the rack with one hand while the rack hangs downward from the handle. Centering the handle from front-to-back and side-to-side causes the rack to hang relatively straight downward depending upon the weight and size of any hoses and/or a flowmeter supported by the rack. In a separate option, the rack may further include a pair of vertical hand holds that are accessible along the front of the rack. While the centered handle is useful for carrying the rack and any equipment supported by the rack, a pair of vertical hand holds accessible along the front of the rack may be useful to grab the rack with two hands, lift the rack into position to one side of the cylindrical gas tank, then move the rack toward the cylindrical gas tank until the permanent magnets engage a side of the cylindrical gas tank. With the permanent magnets securing the rack to the side of the gas tank, the user may release the hand holds and the rack will stay in position supported by the gas tank.

In some embodiments, the rack includes upper and lower sets of vertical sections of the tubular metal. Each set of vertical sections includes first and second vertical sections that are laterally spaced apart to receive an arc of the cylindrical gas tank between the first and second vertical sections. Furthermore, the permanent magnets are effective to secure the rack to the cylindrical gas tank but may also be effective to secure the rack to other ferrous metal structures such as a beam, pipe or storage rack. These other ferrous metal structures may be available at the job site or in a storage area. The first and second vertical sections of the upper set of vertical sections may each include one or more of the permanent magnets. Optionally, the first and second vertical sections of the lower set of vertical sections may also each include one or more of the permanent magnets. In an optional configuration, the upper set of vertical sections of the tubular metal may be formed by the first upper hook or portions of the first and second upper hooks, and the lower set of set of vertical sections of the tubular metal may be formed by the first lower hook or portions of the first and second upper hooks.

In some embodiments, the two or more permanent magnets may include first and second upper permanent magnets that are laterally spaced apart and first and second lower permanent magnets that are laterally spaced apart. The first upper permanent magnet is preferably vertically aligned with the first lower permanent magnet, and the second upper permanent magnet is preferably vertically aligned with the second lower permanent magnet. The vertical alignment of the magnets facilitates the magnets simultaneously engaging the cylindrical gas tank over a range of gas tank diameters. In one non-limiting example, the first and second upper permanent magnets and the first and second lower permanent magnets may be positioned to simultaneously magnetically engage the exterior surface of cylindrical gas tanks having a diameter from about 5 inches to about 9 inches.

In some embodiments, the rack may include one or more horizontal sections of the tubular metal and a plurality of feet may be secured to the one or more horizontal sections of the tubular metal. Each foot may be a compressible pad received about the tubular metal or partially inserted into a hole drilled in the bottom surface of the tubular metal.

Some embodiments of the rack further include an intermediate frame formed with the tubular metal. Accordingly, the first upper hook may be coupled to an upper end of the intermediate frame in an upward orientation, and the first lower hook may be coupled to a lower end of the intermediate frame in a downward orientation. In one option, the first upper hook and the first lower hook may have the same configuration, but are used in opposite orientations (i.e., one oriented to open upward to form the first upper hook and another one oriented to open downward to form the first lower hook). In a further option, the first upper hook, the first lower hook and the intermediate frame may each be formed as a separate continuous loop of the tubular metal having multiple bends. For example, the first upper hook, the first lower hook and the intermediate frame may form three continuous loops of metal pipe having bends that form the desired structure of the respective components. The individual components may then be welded together in the desired configuration.

In some embodiments, the intermediate frame may have a flat panel extending within the intermediate frame. Among other potential uses, the intermediate frame may include a support for a gas flow meter. As non-limiting examples, the flat panel may be made with the same material as the intermediate frame, such as metal tubing, or a different material, such as polycarbonate, acrylic, or other polymers or plastics. In one option, a sheet metal rib is welded to the inward-facing surface of the intermediate frame and adapted to support the flat panel. For example, the sheet metal rib may be about 1/16$^{th}$ inch thick and about 1/2 inch wide, and may be welded to the intermediate frame. The flat panel may be riveted or otherwise fastened to the sheet metal rib. Beneficially, the sheet metal rib may increase the strength or rigidity of the intermediate frame, and the attachment of the sheet metal rib to the intermediate frame allows the flat panel to be formed with a light-weight material, such as a carbon fiber, polycarbonate, various plastics, and metals that may be fastened to the rib in a manner other than welding directly to the intermediate frame. In a further option, a flowmeter mount may be a machined metal component having a flange or other feature that may be secured to the flat panel by rivets or other fasteners.

In some embodiments, a threaded connector may be secured to a front of the rack. For example, the threaded connector may include a blind hole having internal screw threads for threadably receiving a gas flow meter. The threaded connector may receive and protect external thread of a connector to a flow meter while supporting the weight of the flow meter. When the flow meter has been disconnected from the threaded connector, such as during use to control gas flow from the cylindrical gas tank, a protective cap may be secured to the threaded connector to keep dust and dirt out of the blind hole.

The permanent magnets may be any known type, composition and/or shape of permanent magnets. However, one suitable type of permanent magnet is a neodymium magnet. Neodymium magnets are permanent magnets that are made from an alloy of neodymium, iron, and boron. The permanent magnets may have any suitable shape, but embodiments having the permanent magnets received within a metal pipe will preferably have a circular cross-section that fits within the hollow space within the metal pipe. A particular preferred permanent magnet may be cylindrical. One non-limiting example of a permanent magnet is a neodymium magnet having a diameter of about 0.4 inches, a length of about 2.4 inches, and with grade N52 neodymium magnet material having a reported pull force of approximately 65 lbs. In one option, the permanent magnets may include one or more permanent magnet in the shape of a ball. Ball-shaped permanent magnets may fit easily within the hollow space within tubular sections of the rack, including the straight sections and bends that make contact with the cylindrical gas tank. Such ball-shaped permanent magnets may be used alone or in combination with cylindrical magnets in order to increase or maximize the amount of magnetic force that a given rack is capable of creating. Furthermore, ball-shaped permanent magnets may be positioned within bent portions of the metal pipe, such as a section of metal pipe that follows the contour of a given cylindrical gas tank. Ball-shaped permanent magnets may also be received within the metal pipe yet allow the metal pipe to be bent properly and smoothly without making visual contortions in the metal pipe.

Some embodiments may use sleeves or pads of compressible material to provide cushioning to the rack. In one option, a non-slip rubber or polymeric pad, sleeve or wrap may be secured to a section of tubular metal, such as to form a cushioned handle grip, a soft foot at the base of the rack, or a non-slip, non-abrasive surface about the sections that make contact with the bottle.

FIGS. 1A-B are perspective and front views of an apparatus for supporting a gas flow meter and two gas hoses according to a first embodiment. The apparatus may be referred to as a magnetic hanger because it is magnetically securable to a side of a cylindrical gas tank and provides hooks and connectors for hanging or otherwise stored gas hoses and flow meters for use in a welding process.

In reference to FIG. 1A, the apparatus 10 includes a rack 20 and two or more permanent magnets 12 (illustrated in dashed lines) physically secured to the rack 20. More specifically, the apparatus 10 of FIG. 1A illustrates a rack 20 having permanent magnets 12 secured within four different vertical sections of a metal pipe structure having bends that form the structure shown. The permanent magnets 12 may be retained in the short vertical sections shown by bend above and just below the permanent magnets 12. Other methods of securing magnets to a rack may also be utilized, such as securing the permanent magnets with screws or adhesive without limitation.

The rack 20 includes a first upper hook 30 and a first lower hook 40. The rack 20 further includes an intermediate frame 70. The first upper hook 30 is coupled to an upper end of an intermediate frame 70 with the first upper hook 30 in an upward orientation (i.e., opening upward). Similarly, the first lower hook 40 is coupled to a lower end of the intermediate frame 50 with the first lower hook 40 in a downward orientation (i.e., opening downward). As shown, the first upper hook 30 is vertically aligned with the first lower hook 40. In these and other positions, the first upper hook 30 and the first lower hook 40 are disposed for winding a first hose 14 about the first upper hook 30 and the first lower hook 40 in a front-to-back configuration (see first hose 14 in FIG. 1C).

The rack 20 further includes a second upper hook 50 and a second lower hook 60. As with the first upper and lower hooks 30, 40, the second upper and lower hooks 50, 60 are coupled to the upper and lower ends of the intermediate frame 50. As shown, the second upper hook 50 is vertically aligned with the second lower hook 60, with the second upper hook 50 in an upward configuration (i.e., opening upward) and the second lower hook 60 in a downward configuration (i.e., opening downward). In these and other positions, the second upper hook 50 and the second lower hook 60 are disposed for winding a second hose 16 about the second upper hook 50 and the second lower hook 60 in a front-to-back configuration (see second hose 16 in FIG. 1C).

The first upper hook 30 and the first lower hook 40 extend in a first lateral direction (generally to the left in FIG. 1A), and the second upper hook 50 and the second lower hook 60 extend in a second lateral direction (generally to the right in FIG. 1A) that is generally opposite of the first lateral direction. Furthermore, the first upper hook 30 and the second upper hook 50 are formed as a substantially continuous loop of the tubular metal having multiple bends. For example, a single piece of the tubular metal, such as a metal pipe, may be bent into the illustrated configuration with the two ends 31, 51 being brought together in alignment and proximate the same location. Optionally, the two ends 31, 51 may be welded together at some point 15 to form a continuous loop.

Similarly, the first lower hook 40 and the second lower hook 60 are formed as a substantially continuous loop of the tubular metal having multiple bends. For example, a single piece of the tubular metal, such as a metal pipe, may be bent into the illustrated configuration with the two ends 41, 61 being brought together in alignment and proximate the same location. Optionally, the two ends 41, 61 may be welded together at some point 13 to form a continuous loop.

The intermediate frame 70 may also be formed as a continuous loop of the tubular metal having multiple bends. For example, a single piece of the tubular metal, such as a metal pipe, may be bent into the illustrated configuration with the two ends 71, 72 being brought together in alignment and proximate the same location. Optionally, the two ends 71, 72 may be welded together at some point 17 to form a continuous loop.

In the embodiment shown, the tubular metal structure that forms the first and second upper hooks 30, 50 is identical to the tubular metal structure that forms the first and second lower hooks 40, 60. However, the two tubular structures (i.e., a first tubular structure including the upper hooks 30, 50 and a second tubular structure including the lower hooks 40, 60) may be disposed in opposite orientations. In other embodiments, the tubular metal structures may be different or merely similar. Still, the upper tubular structure may further include a handle 37 and the lower tubular structure may further include a support 47 using the same or similar configuration of the tubular structures.

Independent of whether the upper and lower tubular metal structures are formed as a continuous loop, any one or more of the first upper hook 30, first lower hook 40, second upper hook 50, and second lower hook 60 may form a loop hook. A loop hook is formed when an elongate structural member extends out and back to form a loop in the shape of a hook. Accordingly, the hook may be light weight, yet have a broad effective width and no terminal ends to deal with.

For example, a first hose and/or cord may be wound around a first leg 32 and a second leg 34 of the first upper hook 30, as well as around a first leg 42 and a second leg 44 of the first lower hook 40. By winding the hose and/or cord around these four legs 32, 34, 42, 44, the first hose and/or cord may be secured in coiled configuration with no sharp bends in the first hose and/or cord. Similarly, a second hose and/or cord may be wound around a first leg 52 and a second leg 54 of the second upper hook 50, as well as around a first leg 62 and a second leg 64 of the second lower hook 60. By winding the second hose and/or cord around these four legs 52, 54, 62, 64, the second hose and/or cord may be secured in coiled configuration with no sharp bends in the second hose and/or cord.

The rack 20 includes two upper vertical sections 36, 56 of the tubular metal that are disposed along the back of the rack and laterally spaced apart to receive an arc of the cylindrical gas tank between the two vertical sections 36, 56. These two upper vertical sections 36, 56 are the preferred location for securing permanent magnets 12. The rack 20 further includes two lower vertical sections 46, 66 of the tubular metal that are also disposed along the back of the rack and laterally spaced apart to receive an arc of the cylindrical gas tank between the two vertical sections 46, 66. These two lower vertical sections 36, 56 may also securing permanent magnets 12. In the configuration shown, the first upper vertical section 36 is axially aligned with the first lower vertical section 46, and the second upper vertical section 56 is axially aligned with the second lower vertical section 66. In this configuration, each of the vertical sections 36, 46, 56, 66 may simultaneously contact the side of a cylindrical gas tank and the permanent magnets 12 secured to each of the vertical sections 36, 46, 56, 66 may simultaneously magnetically engage the cylindrical gas tank. Accordingly, the rack 20 may be magnetically secured to the cylindrical gas tank in a stable manner to support any hoses, flow meters or other equipment supported by the rack 20. Optionally, the two upper vertical sections 36, 56 could secure permanent magnets 12, with the two lower vertical sections 46, 66 forming points of contact against the cylindrical gas tank without permanent magnets.

Although the rack 20 may be grabbed by a user in various locations, the rack 20 may include some preferred features for handling. First, the rack 20 may include a conveniently located section that forms a handle 37. As shown, the handle 37 is accessible along the top of the rack 20 and is substantially centered front-to-back and side-to-side of the rack 20. Second, the rack 20 may be grabbed with two hands at opposing positions 73, 74 along the sides of the frame 70. Where the frame 70 has a flat panel 75 extending within the frame 70, the flat panel 75 may have a pair of cut-outs 77, 78 that cooperate with the frame 70 at positions 73, 74 to form a pair of hand holds. In one example, a user may grab the rack 20 by the handle 37 to carry the rack in one hand with the arm extending down to the user's side. Once at a work location, the user may set the rack 20 on the ground, then grab the hand holds to lift the rack and position it against a cylindrical gas tank.

For setting the rack 20 on the ground or other surface, the first lower hook 40, the second lower hook 60, the frame 70 and any other section, such as the horizontal section 46, may lie in a plane to rest in a stable manner on a flat surface. The rack 20 is shown with feet 18 secured at various locations along the bottom of the rack 20.

The rack 20 further includes a threaded connector 80 secured to a front of the rack 20. For example, the threaded connector 80 may be connected to, or integrated with, the panel 75. In one embodiment, the threaded connector 80 may include a blind hole having internal screw threads for threadably receiving a gas flow meter.

FIG. 1B is a front view of the rack 20. The rack 20 has component labeled with the same reference numbers that were used to identify the same components in FIG. 1A. However, the front view of FIG. 1B highlights that the arrangement of the first upper hook 30, the first lower hook 40, the second upper hook 50, and the second lower hook 60. It can be seen that the first upper hook 30 and the first lower hook 40 are vertically aligned to form a first (non-rotational) hose reel, and the second upper hook 50 and the second lower hook 60 are vertically aligned to form a second (non-rotational) hose reel. Furthermore, FIG. 1B shows three of the feet 18 supporting the rack 20 as it rests on a flat surface.

Figure 1C:
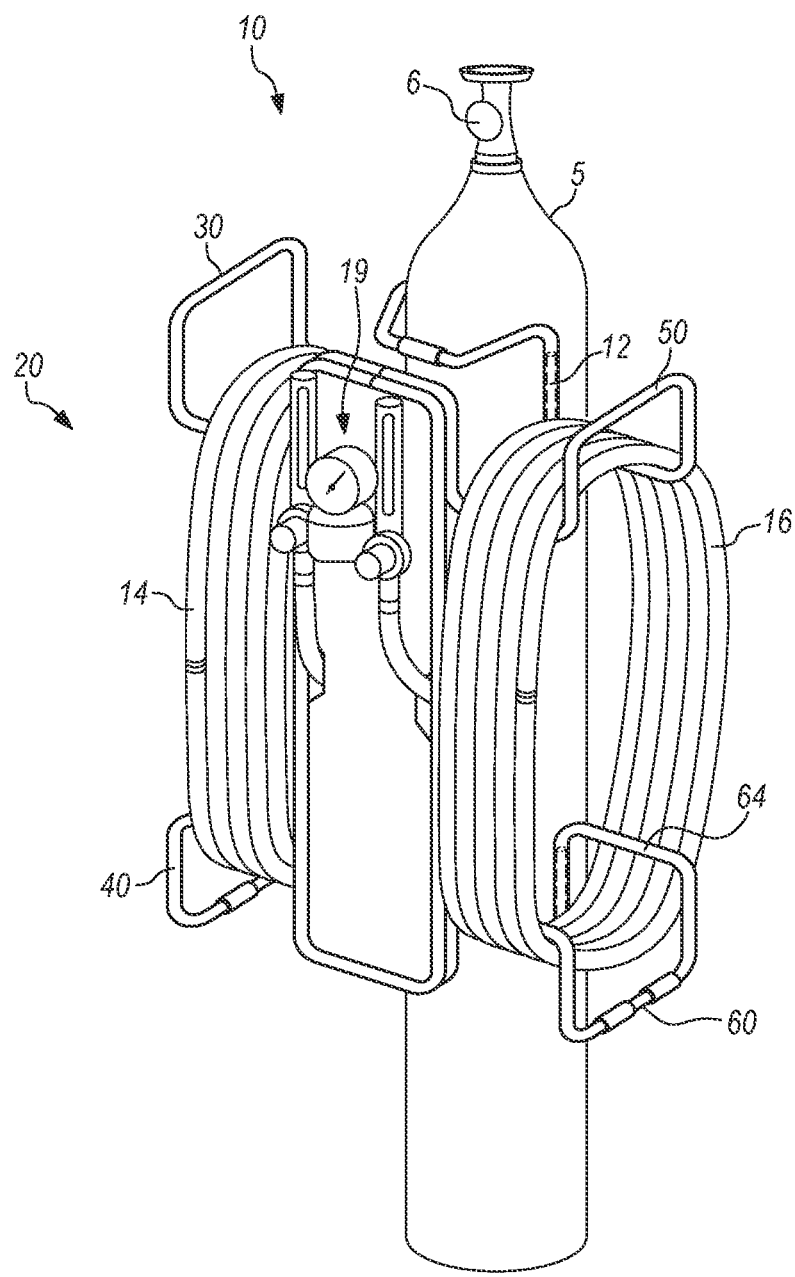
FIG. 1C is a perspective view of the magnetic hanger that is magnetically secured to a cylindrical gas tank and supports a gas flow meter and two gas hoses.

FIG. 1C is a perspective view of the apparatus 10 with the rack 20 magnetically secured to a cylindrical gas tank 5 using permanent magnets 12 (only one shown; see also FIG. 1A). The rack 20 is elevated above the floor or ground upon which the cylindrical gas tank 5 sits. The only necessary connection between the rack 20 and the cylindrical gas tank 5 is the magnetic engagement (i.e., magnetic attraction or magnetic pull) between the permanent magnets 12 and the cylindrical gas tank 5.

The rack 20 has the same configuration as in FIGS. 1A and 1B but illustrates a first hose 14 supported by the first upper hook 30 and the first lower hook 40, as well as a second hose 14 supported by the second upper hook 50 and the second lower hook 60. The rack 20 also supports a dual flow meter and flow regulator 19 that is secured to the threaded connector 80 (not shown; see FIGS. 1A and 1B). Note that the dual flow meter and flow regulator 19 is in the proper orientation to be disconnected from the threaded connector 80 and raised slightly for subsequent connection to the threaded port 6 of the cylindrical gas tank 5. This may be accomplished without disconnecting either of the two hoses 14, 16 from the dual flow meter and flow regulator 19 and without uncoiling or unwinding the hoses and/or cords from the rack. In reference to FIG. 1A and 1B, note how the first hose 14 is wound around the four legs 32, 34, 42, 44, and the second hose 16 is wound around the four legs 52, 54, 62, 64.

In one non-limiting example, the rack 20 may be equipped or outfitted with a hose, such as 100 ft of inert gas argon hose. The rack may be further equipped or outfitted with a TIG torch with hoses and hookups for a welding machine and a dual flowmeter for coupling to the tank. Although the weight of these items may vary between different manufacturers and the length of hose used, but the rack with neodymium magnets have been shown to support equipment weighing as much as about 16.6 lbs. It is believed that the use of additional magnets will enable the rack to support even greater amounts of weight.

Figure 2:
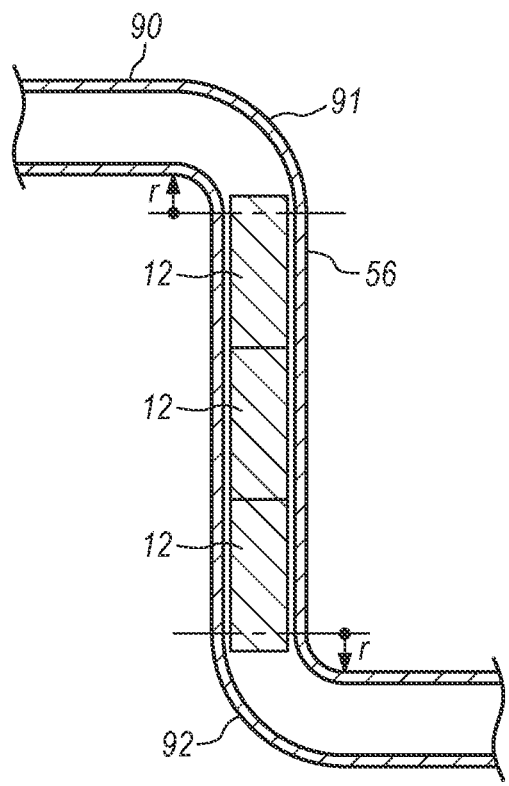
FIG. 2 is a cross-sectional diagram of metal pipe that secures a pair of magnets in a vertical section of the metal pipe.

FIG. 2 is a cross-sectional diagram of a partial section of metal pipe 90 that secures a pair of magnets 12 in a vertical section 56 of the metal pipe 90. With one or more permanent magnets 12 that have a circular cross-section, the permanent magnets 12 are received in a hollow space within the metal pipe 90 that forms the vertical section 56. The metal pipe 90 has a first bend 91 and a second bend 92 adjacent the vertical section 56 such that the permanent magnets 12 are retained within the vertical section 56. In this illustration, the permanent magnets 12 are rigid and of a size that is unable to pass through the bends 91, 92 and are effectively retained within the vertical section 56. No adhesives or fasteners are necessary to secure the permanent magnets 12 to the rack 20, but adhesives or fasteners may be used in combination with, or as a substitute for, placing the permanent magnets within the metal pipe 90 between bends 91, 92. Optionally, the bends 91, 92 and/or other bends in the rack may have the same radius ("r"), such as a 1.5-inch radius. As shown, the setback of the bend may slightly catch the secure the permanent magnets in place.

Figure 3:
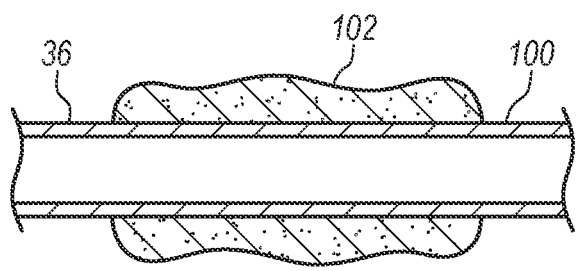
FIG. 3 is a cross-sectional diagram of a compressible sleeve received about a portion of metal pipe to form a handle.

FIG. 3 is a cross-sectional diagram of a portion of metal pipe 100 that may be positioned to form the handle 37. Optionally, the handle 37 is formed from a horizontal section of the metal pipe 100. In a separate option, a compressible pad or sleeve 102 may be securely received about the metal pipe 10 or otherwise formed as part of the rack.

Figure 4:
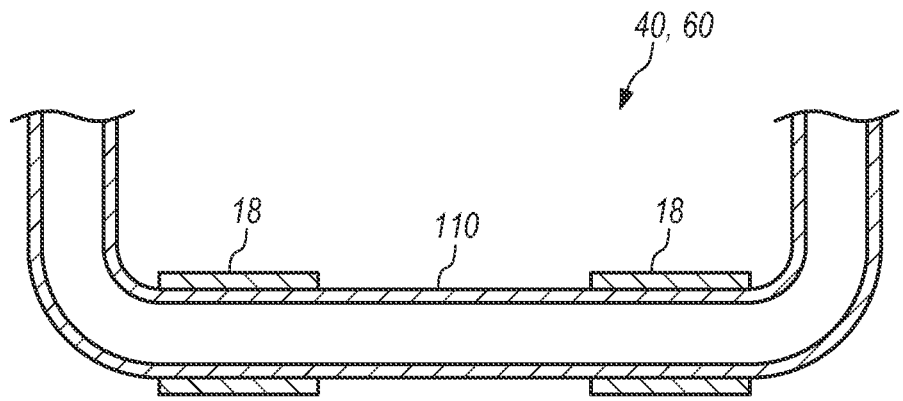
FIG. 4 is a cross-sectional diagram of two feet secured to a bottom horizontal section of metal pipe.

FIG. 4 is a cross-sectional diagram of two feet 18 secured to a bottom horizontal section of metal pipe 110, as may form a part of the first or second lower hook 40, 60. The horizontal section of metal pipe 110 has two a compressible sleeve 18 received about the metal pipe 110.

Figure 5:
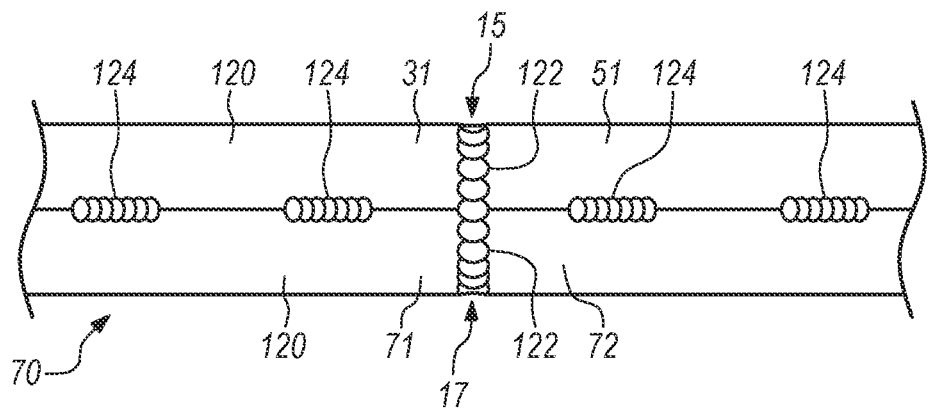
FIG. 5 is a top view of an upper rack welded to a frame.

FIG. 5 is a top view of a pair of metal pipes 120 having their ends welded together to form a continuous loop, and the two metal pipes welded together along a distance of close contact. The welds 122 secure the ends of the pipes 120 and the welds 124 secure the two metal pipes together. The configuration of metal pipes may be implemented where the upper tubular structure (including first and second upper hooks 20, 50) is connected to the top of the intermediate frame 70. Accordingly, the two ends 31, 51 are welded together at point 15 to form a continuous loop, and the two ends 71, 72 are welded together at point 17 to form a continuous loop.

Figure 6A:
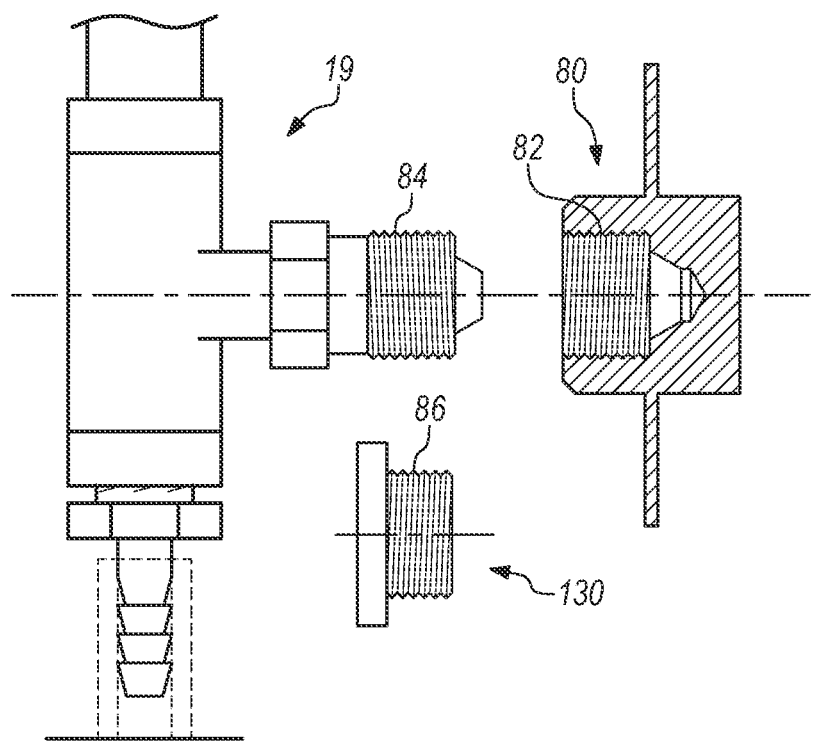
FIG. 6A is a partial cross-sectional view of a threaded connector that may threadably secure a gas flow meter and/or a protective cap.
Figure 6B:
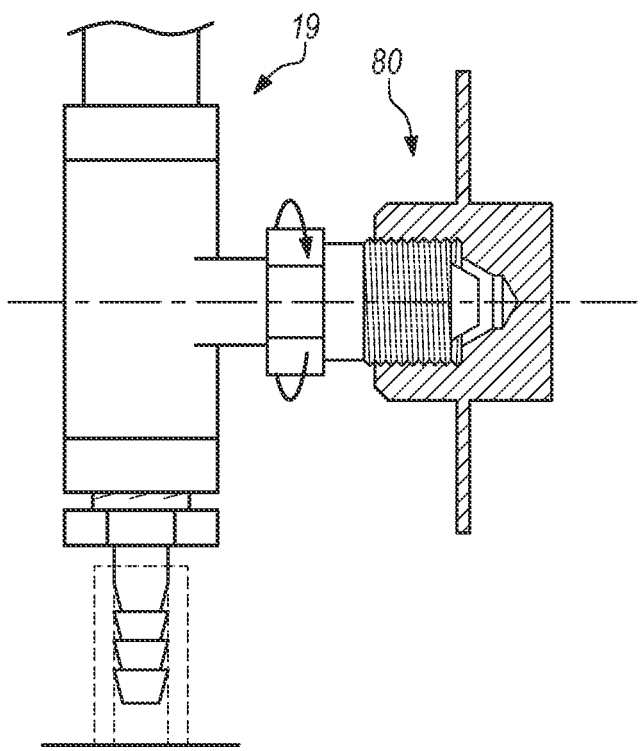
FIG. 6B is a partial cross-sectional view of the gas flow meter threadably connected to the threaded connector.

FIG. 6A is a partial cross-sectional view of a threaded connector 80 that may threadably secure a gas flow meter 19 and/or a protective cap 130. The threads 82 of the threaded connector 80 may be the same as the threads of the port 6 of the cylindrical gas tank 5 (see FIG. 1C). For example, the threads 82 of the threaded connector 80 may be internal threads following the same standard as the internal threads of the port 6 of the cylindrical gas tank 5 (see FIG. 1C). Accordingly, the external threads 84 of the gas flow meter 19 may safely and securely connect with both the threaded connector 80 and the port 6. Similarly, the protective cap 130 may have the threads 86 that also connected with the threads 82 of the threaded connector 80. Alternatively, the protective cap 130 may simply insert into the opening of the threaded connector 80 and be held in place by a light friction fit. FIG. 6B is a partial cross-sectional view of the gas flow meter 19 after having been threadably connected to the threaded connector 80.

Figure 7A:
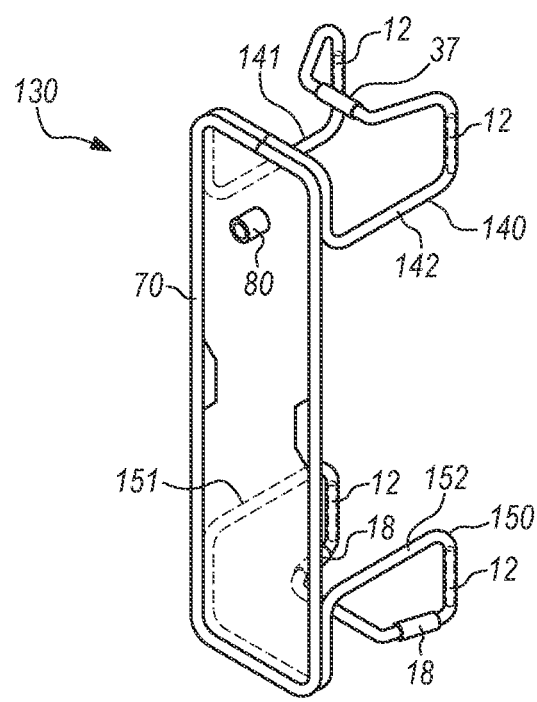
FIGS. 7A-B are perspective and side views of a magnetic hanger for supporting a gas flow meter and one gas hose according to a second embodiment.
Figure 7B:
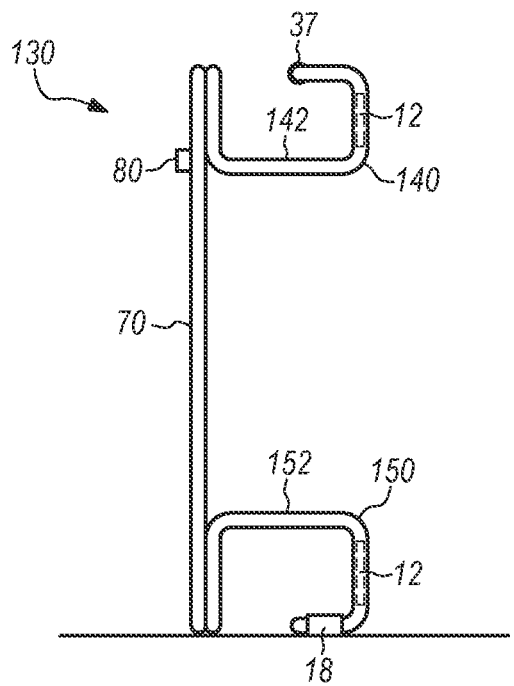

FIGS. 7A-B are perspective and side views of an apparatus including a rack 130 and permanent magnets 12 for supporting welding equipment, such as a gas flow meter and a gas hose according to a second embodiment. The rack 130 is similar to the rack 20 of FIGS. 1A-C, but only has hooks for a single hose. Furthermore, the rack 130 has a first upper hook 140 and a first lower hook 150 upon which a first hose can be would from side-to-side. The rack 130 may otherwise include any one or more feature of the rack 20 of FIGS. 1A-C. For example, the rack 130 may be made with a tubular metal such as a metal pipe, may secure permanent magnets 12 is vertical sections to simultaneously engage a cylindrical gas tank, may form handle 37, may include feet 18, may include an intermediate frame 70 with hand holds and a threaded connector 80, and may form three continuous tubular metal loops that are welded together. However, the rack 130 does not have loop hooks extending laterally to opposing sides of the frame 70. Rather, a hose and/or cord may be wound about the legs 141, 142, 151, 152.

Figure 8A:
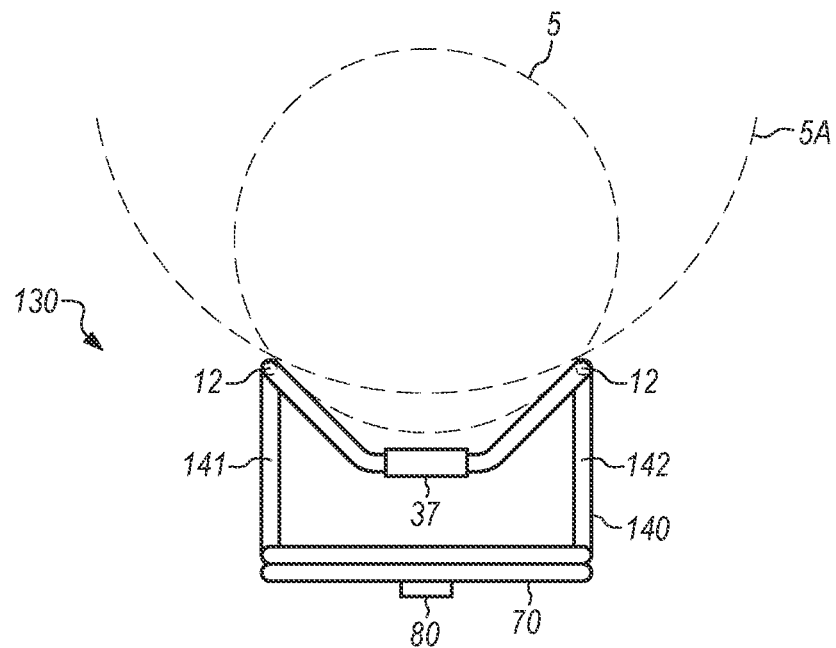
FIGS. 8A-B are top views of the magnetic hanger of FIGS. 7A-B and the magnetic hanger of FIGS. 1A-C, respectively.

FIG. 8A is a top view of the rack 130 of FIGS. 7A-B. The permanent magnets 12 in the vertical sections of the first upper hook 140 are shown to be laterally spaced apart from each other and in contact the side of the cylindrical gas tank 5 (illustrated in dashed lines). Accordingly, the permanent magnets 12 are in sufficiently close proximity to the cylindrical gas tank 5 to magnetically engage the cylindrical gas tank 5 and support the rack 130. Furthermore, the permanent magnets 12 are positioned so that they may magnetically engage different sizes (diameters) of cylindrical gas tanks, including both tank 5 and a hypothetical larger (diameter) tank 5A. The sections of the first upper hook 140 extend inward (frontward) toward the intermediate frame 70 to leave room for a portion of either cylindrical gas tank 5, 5A to extend between the vertical sections that secure the permanent magnets 12. This same arrangement may be implemented for the first lower hook 150 (not shown; see FIG. 7A) to facilitate engagement with either cylindrical gas tank 5, 5A.

Figure 8B:
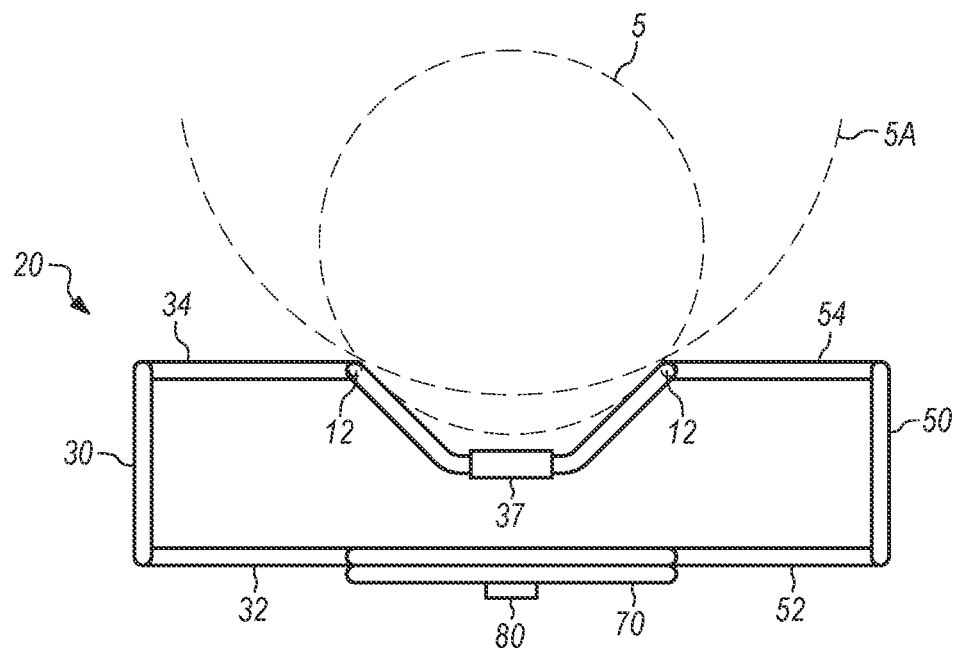

FIG. 8B is a top view of the rack 20 of FIGS. 1A-C. The rack 20 has the first upper hook 30 and the second upper hook 50 (as well as the first lower hook 40 and the second lower hook 60, not shown; see FIG. 1A), but otherwise is secured to either cylindrical gas tank 5, 5A in the same manner as rack 130. The permanent magnets 12 in the vertical sections of the first and second upper hooks 30, 50 are preferably vertically aligned with the permanent magnets 12 in the first and second lower hooks 40, 60, so that four of the permanent magnets 12 may simultaneously magnetically engage either of cylindrical gas tanks 5, 5A despite the fact that the cylindrical gas tanks 5, 5A have different diameters. For example, the permanent magnets may simultaneously magnetically engage the exterior surface of cylindrical gas tanks having a diameter from about 5 inches to about 9 inches.

Figure 9A:
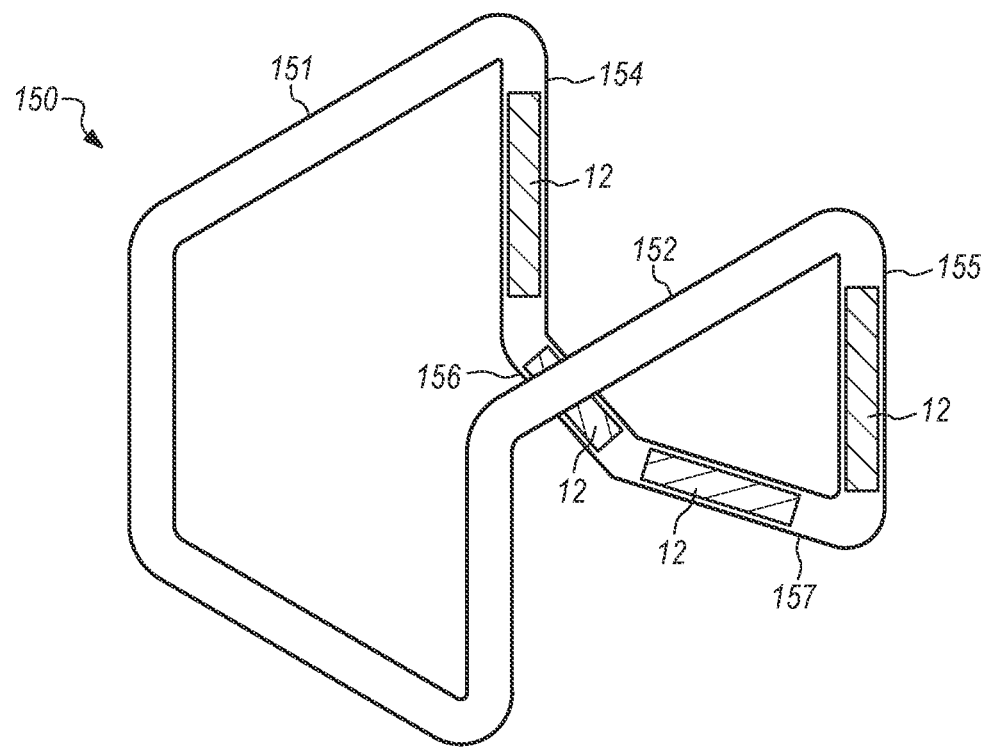
FIGS. 9A-B are perspective and top views of a lower tubular structure of a rack that includes permanent magnets in both a vertical tubular section and a horizontal tubular section.
Figure 9B:
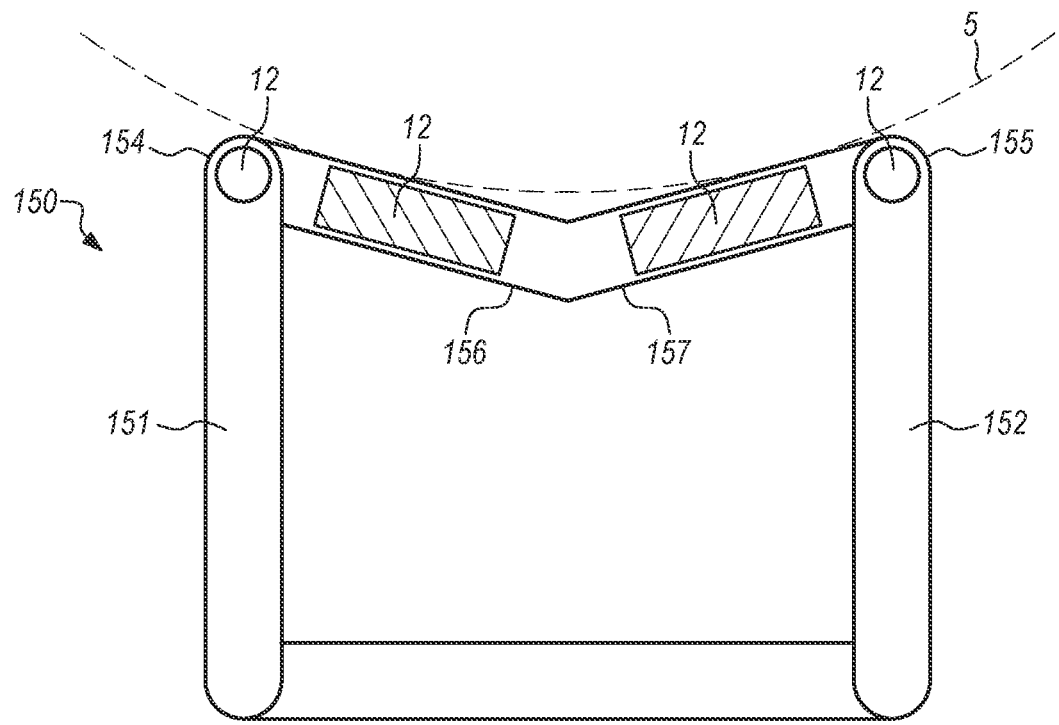

FIGS. 9A-B are perspective and top views of the first lower hook 150 of the rack 130 of FIGS. 7A, 7B and 8A. FIG. 9A shows the first lower hook 150 with the legs 151, 152. Permanent magnets 12 are received in the two vertical tubular sections 154, 155 as well as the two additional tubular sections 156, 157, which may be horizontal and/or at an angle to horizontal. As a result of placing permanent magnets 12 in a greater number of locations 154, 155, 156, 157, the number of permanent magnets 12 that magnetically engage or attract the cylindrical gas tank may be increased without necessarily increasing the size of the rack or particular tubular sections. However, in order for the permanent magnets 12 in a horizontal or angled tubular sections 156, 157 to magnetically engage or attract the tank, the configuration of those horizontal or angled tubular sections 156, 157 may need to be specifically selected to match or cooperate with a cylindrical gas tank of a particular diameter. Note that the configuration of the tubular sections 156, 157 have been modified slightly from the corresponding tubular sections shown in FIG. 7A in order to position the permanent magnets 12 therein closer to the surface of a cylindrical gas tank.

FIG. 9B is a top view of the first lower hook 150 of the rack 130 of FIGS. 7A. The first lower hook 150 has the two vertical sections 154, 155 in close proximity to the surface of the cylindrical gas tank 5 so that the permanent magnets 12 within the two vertical sections 154, 155 are able to magnetically engage the cylindrical gas tank 5. This is similar to what is shown in FIG. 8A. However, the two horizontal or angled tubular sections 156, 157, which together may form a connection between the two vertical sections 154, 155, also include a pair of permanent magnets 12. As shown, the two horizontal or angled tubular sections 156, 157 follow a path or configuration that approaches the surface of the cylindrical gas tank 5, such that the permanent magnets 12 within the two horizontal or angled tubular sections 156, 157 are also able to magnetically engage the cylindrical gas tank 5. In this manner, the first lower hook 150 may include a greater number of permanent magnets, or a greater amount of permanent magnetic material, than for the first lower hook as shown in FIG. 7A having permanent magnets only in the vertical sections. It should be recognized that the first upper hook 140 of the rack 130 in FIG. 7A or another rack, or another section of this rack or another rack, could be similarly modified to include permanent magnets in other sections or locations in addition to, or as a substitution for, the permanent magnets in the vertical sections. However, the number and/or size of the permanents magnets in a rack may directly affect the amount of weight that may be supported by the rack with the rack remaining in a stationary position magnetically attached to a cylindrical gas tank.

Figure 10:
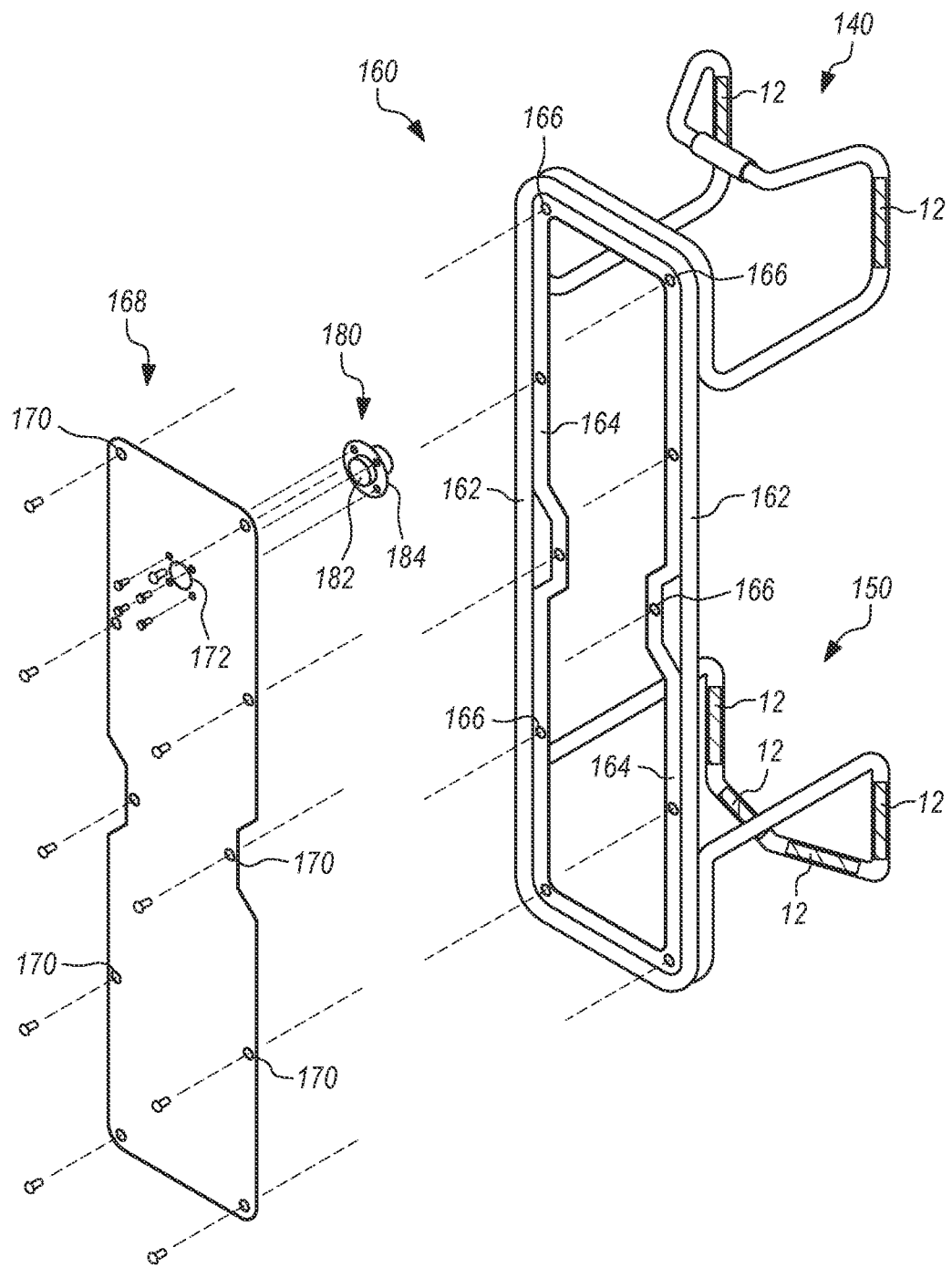
FIG. 10 is a perspective view of a rack having a rib formed inside the intermediate frame and a flat panel secured to the rib.

FIG. 10 is a perspective view of a rack 160 including the first upper hook 140 (as shown in FIGS. 7A-B), the first lower hook 150 (as shown in FIGS. 9A-B), and an intermediate frame 162 that is connected to both the first upper and lower hooks 140, 150. A rib 164 is formed and secured inside the intermediate frame 162. For example, the rib 164 is shown as a sheet metal rib, such as having dimension of about 1/16$^{th}$ inch thick and about 1/2 inch wide following the shape of the intermediate frame 162. Optionally, the rib 164 may be welded to the intermediate frame 162 at any number of points around the interface between these components. The rib 164 has a flat forward face that include holes 166 (ten holes shown) for securing a flat panel 168. The flat panel 168 includes a matching pattern of holes 170 (ten holes shown) so that an equal number of fasteners, such as rivets, may be used to fasten the flat panel 168 to the sheet metal rib 164. Beneficially, the sheet metal rib may increase the strength or rigidity of the intermediate frame, and the attachment of the sheet metal rib to the intermediate frame allows the flat panel 168 to be formed with a light-weight material, such as a carbon fiber, polycarbonate, various plastics, and metals that may be fastened to the rib in a manner other than welding directly to the intermediate frame. Furthermore, a flowmeter mount 180 is secured to the flat panel 168 with additional fasteners so that a machined metal, threaded connector 182 is accessible through a hole 172 through the flat panel 168. For example, the flowmeter mount 180 has a circumferential flange 184 with holes in a pattern that matches a pattern of holes in the flat panel 168 around the hole 172, such that the flange 184 may be secured to the flat panel 168 with fasteners, such as rivets. It should be recognized that the rib and flat panel of the rack 160 may be incorporated into any of the rack configurations disclosed herein.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus, comprising:
   a rack formed with tubular metal, the rack including a first upper hook and a first lower hook, wherein the first upper hook is vertically aligned with the first lower hook, and wherein the first upper hook opens upward and the first lower hook opens downward; and
   two or more permanent magnets positioned to simultaneously magnetically engage a side surface of a cylindrical gas tank and magnetically secure the rack to the side surface of the cylindrical gas tank, wherein the rack includes at least two vertical sections of the tubular metal that are laterally spaced apart to receive an arc of the cylindrical gas tank between the at least two vertical sections, and wherein, for each of the at least two vertical sections, one or more of the permanent magnets are received in a hollow space within the tubular metal that forms the vertical section.

2. The apparatus of claim 1, wherein the first upper hook and the first lower hook are disposed for winding a hose about the first upper hook and the first lower hook in a side-to-side configuration.

3. The apparatus of claim 1, wherein the rack includes a second upper hook and a second lower hook, wherein the second upper hook is vertically aligned with the second lower hook, and wherein the second upper hook opens upward and the second lower hook opens downward.

4. The apparatus of claim 3, wherein the first upper hook and the first lower hook extend in a first lateral direction, and wherein the second upper hook and the second lower hook extend in a second lateral direction generally opposite of the first lateral direction.

5. The apparatus of claim 4, wherein the first upper hook and the first lower hook are disposed for winding a first hose about the first upper hook and the first lower hook in a front-to-back configuration, and wherein the second upper hook and the second lower hook are disposed for winding a second hose about the second upper hook and the second lower hook in a front-to-back configuration.

6. The apparatus of claim 1, wherein the first upper hook is a loop hook, and wherein the first lower hook is a loop hook.

7. The apparatus of claim 1, wherein, for each of the at least two vertical sections, the permanent magnets received within the tubular metal are retained in the vertical section of the tubular metal by bends in the tubular metal at both ends of the vertical section.

8. The apparatus of claim 7, wherein the tubular metal has a nominal pipe size of 0.5 inch, and wherein bends in the tubular metal have a radius between about 1 and about 2 inches.

9. The apparatus of claim 1, wherein the rack further includes a handle that is accessible along the top of the rack and is substantially centered front-to-back and side-to-side of the rack.

10. The apparatus of claim 9, wherein the rack further includes a pair of vertical hand holds that are accessible along the front of the rack.

11. An apparatus, comprising:
a rack formed with tubular metal, the rack including a first upper hook and a first lower hook, wherein the first upper hook is vertically aligned with the first lower hook, and wherein the first upper hook opens upward and the first lower hook opens downward; and
two or more permanent magnets physically secured to the rack, wherein the permanent magnets are positioned to simultaneously magnetically engage a side surface of a cylindrical gas tank and magnetically secure the rack to the side surface of the cylindrical gas tank, wherein the rack includes upper and lower sets of vertical sections of the tubular metal, wherein each set of vertical sections includes first and second vertical sections that are laterally spaced apart to receive an arc of the cylindrical gas tank between the first and second vertical sections.

12. The apparatus of claim 11, wherein the first and second vertical sections of the upper set of vertical sections each include one or more of the permanent magnets.

13. The apparatus of claim 12, wherein the first and second vertical sections of the lower set of vertical sections each include one or more of the permanent magnets.

14. The apparatus of claim 11, wherein the upper set of vertical sections of the tubular metal are formed by the first upper hook, and wherein the lower set of set of vertical sections of the tubular metal are formed by the first lower hook.

15. The apparatus of claim 1, wherein the two or more permanent magnets include first and second upper permanent magnets that are laterally spaced apart and first and second lower permanent magnets that are laterally spaced apart, wherein the first upper permanent magnet is vertically aligned with the first lower permanent magnet, and wherein the second upper permanent magnet is vertically aligned with the second lower permanent magnet.

16. The apparatus of claim 15, wherein the first and second upper permanent magnets and the first and second lower permanent magnets may simultaneously magnetically engage the exterior surface of cylindrical gas tanks having a diameter from about 5 inches to about 9 inches.

17. An apparatus, comprising:
a rack formed with tubular metal, the rack including a first upper hook and a first lower hook, wherein the first upper hook is vertically aligned with the first lower hook, and wherein the first upper hook opens upward and the first lower hook opens downward;
two or more permanent magnets physically secured to the rack, wherein the permanent magnets are positioned to simultaneously magnetically engage a side surface of a cylindrical gas tank and magnetically secure the rack to the side surface of the cylindrical gas tank;
one or more horizontal sections of the tubular metal that forms the rack; and
a plurality of feet secured to the one or more horizontal sections of the tubular metal.

18. The apparatus of claim 1, wherein the rack further includes an intermediate frame formed with the tubular metal.

19. The apparatus of claim 18, wherein the first upper hook is coupled to an upper end of an intermediate frame in an upward orientation, and wherein the first lower hook is coupled to a lower end of the intermediate frame in a downward orientation.

20. The apparatus of claim 19, wherein the first upper hook and the first lower hook have the same configuration.

21. The apparatus of claim 19, wherein the first upper hook is formed as a continuous loop of the tubular metal having multiple bends, the first lower hook is formed as a continuous loop of the tubular metal having multiple bends and the intermediate frame is formed as a continuous loop of the tubular metal having multiple bends.

22. The apparatus of claim 1, further comprising:
a threaded connector secured to a front of the rack, wherein the threaded connector includes a blind hole having internal screw threads for threadably receiving a gas flow meter.

23. The apparatus of claim 1, wherein the rack includes upper and lower sets of vertical sections of the tubular metal, wherein each set of vertical sections includes first and second vertical sections that are laterally spaced apart to receive an arc of the cylindrical gas tank between the first and second vertical sections.

24. The apparatus of claim 23, wherein the first and second vertical sections of the upper set of vertical sections each include one or more of the permanent magnets received in a hollow space within the tubular metal that forms the vertical section, and wherein the first and second vertical sections of the lower set of vertical sections each include one or more of the permanent magnets received in a hollow space within the tubular metal that forms the vertical section.

25. The apparatus of claim 1, further comprising:
one or more horizontal sections of the tubular metal that forms the rack; and
a plurality of feet secured to the one or more horizontal sections of the tubular metal.

* * * * *